United States Patent
Zhao et al.

(10) Patent No.: US 10,959,427 B2
(45) Date of Patent: Mar. 30, 2021

(54) ATTRACTANT OF LADYBUGS, APHID'S NATURAL ENEMY

(71) Applicant: Zhejiang University, Zhejiang (CN)

(72) Inventors: Jinhao Zhao, Zhejiang (CN); Zhongshan Li, Zhejiang (CN); Biao Wang, Zhejiang (CN); Zhongyan Wang, Zhejiang (CN); Jingli Cheng, Zhejiang (CN); Yongjun Du, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 16/851,096

(22) Filed: Apr. 17, 2020

(65) Prior Publication Data

US 2020/0267972 A1 Aug. 27, 2020

Related U.S. Application Data

(63) Continuation of application No. PCT/CN2019/125449, filed on Dec. 14, 2019.

(30) Foreign Application Priority Data

Oct. 17, 2018 (CN) .......................... 201811210127.0
Feb. 21, 2019 (CN) .......................... 201910132778.0

(51) Int. Cl.
| | |
|---|---|
| *A01N 27/00* | (2006.01) |
| *A01N 31/02* | (2006.01) |
| *A01N 31/04* | (2006.01) |
| *A01N 37/02* | (2006.01) |

(52) U.S. Cl.
CPC ............. *A01N 27/00* (2013.01); *A01N 31/02* (2013.01); *A01N 31/04* (2013.01); *A01N 37/02* (2013.01)

(58) Field of Classification Search
None
See application file for complete search history.

(56) References Cited

U.S. PATENT DOCUMENTS

2005/0249769 A1* 11/2005 Zhu .................... A01N 37/40
424/405

FOREIGN PATENT DOCUMENTS

| CN | 1859845 | A | 11/2006 |
| CN | 102273493 | B | 5/2013 |
| CN | 105052929 | A | 11/2015 |
| CN | 105746585 | A | 7/2016 |
| CN | 108077284 | A | 5/2018 |

OTHER PUBLICATIONS

LEROY, "Microorganisms from aphid honeydew attract and enhance the efficacy of natural enemies", Nature Communications, 2:348, pp. 1-7, published Jun. 14, 2011 (Year: 2011).*

Muhammad Binyameen et al., Modulation of Reproductive Behaviors by Non-Host Volatiles in the Polyphagous Egyptian Cotton Leafworm, *Spodoptera littoralis*, Journal of Chemical Ecology, 2013, pp. 1273-1283, vol. 39, No. 10.

S. Al Abassi et al., Response of the Seven-Spot Ladybird to an Aphid Alarm Pheromone and an Alarm Pheromone Inhibitor is Mediated by Paired Olfactory Cells, Journal of Chemical Ecology, Dec. 31, 2000, pp. 1765-1771, vol. 26, No. 7.

* cited by examiner

*Primary Examiner* — Robert T. Crow
*Assistant Examiner* — John P Nguyen

(57) ABSTRACT

The present disclosure provides a ladybug attractant, the ladybug being a natural enemy of an aphid, the ladybug attractant including a ladybug sex pheromone, a synomone and a kairomone; wherein the synomone is an aphid-induced plant volatile; the kairomone is composed of an aphid alarm pheromone, an aphid body surface extract and an aphid honeydew volatile. The ladybug attractant shows good attracting effect, good repeatability, high stability, and a broad spectrum of beneficial ladybugs such as *Coccinella septempunctata, Harmonia axyridis*, and *Propylaea japonica* in laboratory and field experiments.

1 Claim, No Drawings

ATTRACTANT OF LADYBUGS, APHID'S NATURAL ENEMY

CROSS-REFERENCE TO RELATED APPLICATION

This application is a continuation application of PCT patent application No. PCT/CN2019/125449 filed on Dec. 14, 2019, which claims priority of Chinese Patent Application No. 201910132778.0 filed on Feb. 21, 2019 and Chinese Patent Application No. 201811210127.0 filed on Oct. 17, 2018. The entire content of the above-identified applications is incorporated herein by reference.

TECHNICAL FIELD

The present disclosure relates to a pest attractant, in particular to a ladybug attractant, the ladybug being a natural enemy of aphids.

BACKGROUND

Biological control, as one of the vital means of integrated pest management, is highly efficient, less polluting, human and animals-safe, and environment-friendly. With the rapid development of modern agriculture, biological control has been widely brought into focus. Natural enemy insects as a special resource are more and more accepted by people. Developed countries have developed natural enemy insect industry since 1960s. At present, there are about 150 kinds of natural enemies produced and sold commercially in the world, of which the main species are *Trichogramma, Chrysopa perla*, predatory mite, predatory mirid bugs and ladybugs, etc., and thus certain social and economic benefits have been achieved.

Ladybug is a generic name for insects belonging to *Coleoptera coccinellidae*. Ladybugs have a variety of feeding habits, which can be divided into plant feeding, predacious and bacterial feeding etc. Among them, predacious ladybugs account for a large proportion, and have a good control effect on eggs and larvae of aphids, whiteflies, scale insects and some lepidoptera pests. As a result, ladybugs become one of the important natural enemy insects in pest biological control.

Insects use their own unique chemoreceptor organs to detect odorous substances from the environment, and decide to produce a corresponding response according to the odorous substances in the environment and their experience obtained by learning. Depending on different compositions, amounts or properties of the semiochemicals, natural enemies exhibit different response behavior actions, such as long-range orientation to habitats and short-range location to hosts or prey etc. The amount of synomone, such as compounds released from pest damaged plants, volatiles released from honeydew source plants, etc. is large, and they can continue to be released after the pests are transferred. Kairomone, such as the host's egg mass, larvae epidermis, worm droppings, adult scales, or secretions from various glands, has a small amount of release, but it accurately indicates the location of the pest immediately. For natural enemy positioning host pests, the two complement each other. Currently, the attractants for ladybugs have been reported in some literatures. In the invention patent "Attractant of *Coccinella septempunctata*" (CN201110180376.1), the attractant is composed of heavy superphosphate, diammonium and plant ash, which can attract *Coccinella septempunctata* adults, but the substances in the attractant do not contain a compound specific attracting ladybugs. The attractant is a coarse formulation obtained according to experience, and has no applicability and specificity. Patent CN201810000523.4 reports an attractant of *Rodolia limbata*, which can be used in *Paramecium* control. The main components of this attractant are volatiles produced by paramecium in their different ages. The volatiles are kairomones of paramecium, and can be utilized by the natural enemies to locate the pests accurately in short-distance; but for the long-distance orientation, this formula is poor effective and cannot allocate the quantity of ladybugs in a wide range of a whole area. CN201610297849.9 reports an attractant for insects as aphids's predatory natural enemies, which is formed by mixing plant volatiles (synomone): α-pinene, eugenol, sophora flower essential oil and matrimony essential oil together, and has an attraction to *Harmonia axyridis, Menochilus sexmaculata, Episyrphus balteatus* and *Chrysoperla sinica*. CN201510579807.X relates to an attractant for natural enemies of cotton aphids, which is produced by mixing pest induced volatiles (synomone): methyl salicylate, 2-phenylethanol, phenylacetaldehyde and α-terpineol together. The main constituents of the attractants in both CN201610297849.9 and CN201510579807.X are synomones. However, different plants in their life stages produce different synomones in components and amounts. Besides, there is a great difference in volatiles released by different plants. Moreover, volatiles released by non-host plants play an important role on long-distance orientation of natural enemies. Therefore, the effect of utilizing synomones alone to attract the natural enemies is not stable.

Hence, there is a need to improve the existing technology.

SUMMARY

The problem to be solved by the present disclosure is to provide an efficient ladybug attractant, the ladybug being a natural enemy of aphids, the attractant comprising a ladybug sex pheromone, a synomone and a kairomone, wherein the synomone is an aphid-induced plant volatile; and the kairomone is composed of an aphid alarm pheromone, an aphid body surface extract and an aphid honeydew volatile.

As an improvement of the ladybug attractant:

the ladybug sex pheromone is at least one selected the group consisting of α-humulene, α-bulnesene, β-caryophyllene and 1-vinyl-1-methyl-2,4-bis (propyl-1-ene-2-yl) cyclohexane;

the aphid alarm pheromone is: E-β-farnesenene;

the aphid body surface extract is at least one selected from the group consisting of linalool, benzaldehyde, naphthalene, trans-2-hexenoic acid and 2,5-hexanedione;

the aphid honeydew volatile is at least one selected from the group consisting of isovaleraldehyde, isoamyl alcohol, 3-hydroxy-2-butanone and dipentene; and the aphid-induced plant volatile is at least one selected from the group consisting of methyl salicylate, eugenol, nonanal, leaf alcohol, phenylacetaldehyde and squalene.

As a further improvement on the lady attractant:

the attractant is formed by formulation of the ladybug sex pheromone, the aphid alarm pheromone, the aphid body surface extract, the aphid honeydew volatile, and the aphid-induced plant volatile at a mass ratio of 1:0.1-10:0.1-15:0.1-15:1-20.

As a further improvement on the lady attractant:

the ladybug sex pheromone is one of α-humulene, α-bulnesene, β-caryophyllene and 1-vinyl-1-methyl-2,4-bis (propyl-1-ene-2-yl) cyclohexane;

the aphid body surface extract is one of linalool, benzaldehyde, naphthalene, trans-2-hexenoic acid and 2,5-hexanedione;

the aphid honeydew volatile is one of isovaleraldehyde, isoamyl alcohol, 3-hydroxy-2-butanone and dipentene; and the aphid-induced plant volatile is one of methyl salicylate, eugenol, nonanal, leaf alcohol, phenylacetaldehyde and squalene.

The attractant is formed by formulation of the ladybug sex pheromone, the aphid alarm pheromone, the aphid body surface extract, the aphid honeydew volatile and the aphid-induced plant volatile at a mass ratio of 1:0.5:7:3:12.

The technical advantages of this ladybug attractant are as follows:

This disclosure based on the interaction among pests, natural enemies and plants, combines the ladybug sex pheromone with the kairomone and the synomone for the first time. After adjustment of the proportions of different functional compounds, an unexpected result is obtained. The attractant of this disclosure can not only overcome the defects of the synomone that the composition varies a lot and the guiding effect for natural enemy's short-distance positioning to pest is bad, but also overcome the shortcomings of the kairomone that the effect for natural enemy's long-distance orientation to pest is bad. Furthermore, this disclosure can make up for the defect of unabiding control effect caused by using the ladybug sex pheromone alone which merely attracts male ladybugs and thus prevents them from reproducing. The compound attractant of the present disclosure shows good attracting effect, good repeatability, high stability, and a broad spectrum of beneficial ladybugs such as *Coccinella septempunctata*, *Harmonia axyridis*, and *Propylaea japonica* in both laboratory and field experiments.

DETAILED DESCRIPTION OF EMBODIMENTS

The disclosure will be further described in combination with specific embodiments, but the protection scope of the disclosure is not limited to this.

Example 1 Ladybug Attractant, the Ladybug being a Natural Enemy of Aphids 0.01 mg of α-bulnesene, 0.01 mg of α-humulene, 0.005 mg of E-β-farnesene, 0.07 mg of trans-2-hexenoic acid, 0.07 mg of benzaldehyde, 0.03 mg of isovaleraldehyde, 0.03 mg of dipentene, 0.12 mg of methyl salicylate and 0.12 mg of eugenol were dissolved in 20 μL of n-hexane and mixed uniformly. The above solution was dropped evenly onto a piece of quantitative filter paper (5 cm long and 1.5 cm wide) to obtain a filter paper-loaded compound.

Wind tunnel experiments were performed using a wind tunnel device to determine the behavioral responses of ladybugs to the attractant. The wind tunnel device is 90 cm long, 35 cm wide and 35 cm high. The desired ladybugs were put into a glass tube 30 minutes before the test, and both the ends of the glass tube were sealed with absorbent cotton to adapt the ladybugs to the environment in the wind tunnel. The filter paper-loaded compound was placed on the upper air outlet, and the wind speed in the wind tunnel was 0.3 m/s. The whole process of bioassay was carried out at 28° C. The glass tube was placed at the end of the lower air outlet of the wind tunnel. Timing started and lasted for 30 min. The numbers of take-offs, directional flights, and proximity to attractant sources were recorded and their relative proportions were calculated. The experimental method was referred to the wind tunnel experiment of Binyameen M et al (Journal of Chemical Ecology, 2013, 39(10):1273-1283).

Comparative Example 1

This comparative example provided a ladybug attractant. Compared with Example 1, the only difference was that this attractant only contained ladybug sex pheromone components (α-bulnesene 0.01 mg and α-humulene 0.01 mg), which were dissolved in 20 μL of n-hexane and mixed uniformly. The above solution was then dropped evenly onto a piece of quantitative filter paper (5 cm long and 1.5 cm wide).

Comparative Example 2

This comparative example provided a ladybug attractant. Compared with Example 1, the only difference was that the attractant only contained 0.005 mg of aphid alarm pheromone component E-β-farnesene, which was dissolved in 20 μL of n-hexane and mixed uniformly. The above solution was then dropped evenly onto a piece of quantitative filter paper (5 cm long and 1.5 cm wide).

Comparative Example 3

This comparative example provided a ladybug attractant. Compared with Example 1, the only difference was that the attractant only contained aphid body surface extracts (trans-2-hexenoic acid 0.07 mg and benzaldehyde 0.07 mg), which were dissolved in 20 μL of n-hexane and mixed uniformly. The above solution was then dropped evenly onto a piece of quantitative filter paper (5 cm long and 1.5 cm wide).

Comparative Example 4

This comparative example provided a ladybug attractant. Compared with Example 1, the only difference was that the attractant only contained aphid honeydew volatiles (isopentaldehyde 0.03 mg and dipentene 0.03 mg), which were dissolved in 20 μL of n-hexane. The above solution was then dropped evenly onto a piece of quantitative filter paper (5 cm long and 1.5 cm wide).

Comparative Example 5

This comparative example provided a ladybug attractant. Compared with Example 1, the only difference was that the attractant only contained aphid-induced plant volatiles (methyl salicylate 0.12 mg and eugenol 0.12 mg), which were dissolved in 20 μL of n-hexane. The above solution was then dropped evenly onto a piece of quantitative filter paper (5 cm long and 1.5 cm wide).

The behavioral responses of ladybugs to the attractants in Comparative Examples 1-5 were measured by using a wind tunnel device (same conditions as in Example 1).

Wind tunnel experimental results were shown in Table 1.

TABLE 1

| Formula | Proportion of Take Off | | Proportion of Knocking Filter Paper | | Proportion of Passing Through ½ of Wind Tunnel | |
|---|---|---|---|---|---|---|
| | Female Proportion | Male Proportion | Female Proportion | Male Proportion | Female Proportion | Male Proportion |
| Example 1 | 40% | 46.8% | 36.7% | 33.3% | 86.7% | 93.3% |
| Comparative Example 1 | 0 | 33.3% | 0 | 13.3% | 13.3% | 80% |
| Comparative Example 2 | 13.3% | 6.7% | 23.3% | 28.3% | 53.3% | 40% |
| Comparative Example 3 | 20% | 0 | 33.3 | 25% | 46.7% | 53.3% |
| Comparative Example 4 | 13.3% | 13.3% | 6.7% | 20% | 66.7% | 58.3% |
| Comparative Example 5 | 20% | 26.8% | 13.3% | 6.7% | 60% | 66.7% |

Proportion of take-off = number of take-off insects/total number of insects; proportion of knocking filter paper = number of insects knocking filter paper/total number of insects; proportion of passing through½ of wind tunnel = number of insects passing through ½ of wind tunnel/total number of insects.

The number of take-off ladybugs indicated the take-off situation of the ladybugs stimulated by the compound. The take-off and passing through ½ of the wind tunnel of the ladybugs occurred at the farthest point of the lower air outlet of the wind tunnel from the source material, indicating the ability of ladybugs to search for compounds at long distance. The number of knocking filter paper characterized the ability of ladybugs to search for compounds at short range. In Example 1, the number of take-off female and male ladybugs, the number of female and male ladybugs knocking filter paper, and the number of female and male ladybugs passing ½ of the wind tunnel were all higher than those of the comparative examples, and there was no significant difference between male and female ladybugs in Example 1. It can be seen that the formulation of Example 1 had good attraction effect on both male and female ladybugs.

The attractant in Comparative Example 1 was composed of only ladybug sex pheromone, which showed better attraction to male ladybugs but worse than Example 1. The attractants in comparative examples 2, 3 and 4 were composed of only kairomones, exhibiting poor attraction to male and female ladybugs, especially their stimulative effects on taking off and passing through ½ of the wind tunnel of the ladybugs were obvious worse than the other two groups. This showed kairomones had poor effect on guiding ladybugs' search for compound at long distance. The attractant in Comparative Example 5 was composed of only aphid-induced volatiles, i.e. synomone. The result of this comparative example showed that the number of ladybugs knocking filter paper was lower than those of the other groups. The number of ladybugs taking off and the number of ladybugs passing through ½ of the wind tunnel in Comparative Example 5 did not show significant difference with other groups, thus indicating that the synomone had poor effect on guiding ladybugs' search for compound at short distance.

Example 2

Attractant 1: 0.01 mg of 1-vinyl-1-methyl-2,4-bis (propyl-1-ene-2-yl) cyclohexane, 0.005 mg of E-β-farnesene, 0.07 mg of trans-2-hexenoic acid, 0.03 mg of isovaleraldehyde and 0.12 mg of phenylacetaldehyde were dissolved in 20 μL of n-hexane solution, and mixed uniformly. The above solution was dropped evenly onto a piece of quantitative filter paper (5 cm long and 1.5 cm wide).

Attractant 2: 0.01 mg of α-humulene, 0.005 mg of E-β-farnesene, 0.07 mg of 2,5-hexanedione, 0.03 mg of dipentene, 0.12 mg of leaf alcohol were dissolved in 20 μL of n-hexane solution, and mixed uniformly. The above solution was dropped evenly onto a piece of quantitative filter paper (5 cm long and 1.5 cm wide).

Attractant 3: 0.01 mg of α-bulnesene, 0.005 mg of E-β-farnesene, 0.07 mg of benzaldehyde, 0.03 mg of isopentaldehyde and 0.12 mg of squalene were dissolved in 20 μL of n-hexane solution, and mixed uniformly. The above solution was dropped evenly onto a piece of quantitative filter paper (5 cm long and 1.5 cm wide).

Wind tunnel experiments were performed using a wind tunnel device to determine the behavioral responses of ladybugs to the attractants. The wind tunnel device is 90 cm long, 35 cm wide and 35 cm high. The desired ladybugs were put into a glass tube 30 minutes before the test, and both the ends of the glass tube were sealed with absorbent cotton to adapt the ladybugs to the environment in the wind tunnel. The filter paper-loaded compound was placed on the upper air outlet, and the wind speed in the wind tunnel was 0.3 m/s. The whole process of bioassay was carried out at 28° C. The glass tube with the ladybugs was placed at the end of the lower air outlet of the wind tunnel. Timing started and lasted for 30 min. The proportions of take-offs, directional flights, and proximity to attractant sources were recorded.

The wind tunnel experimental results were shown in Table 2.

TABLE 2

| Formula | Proportion of take off | | Proportion of knocking filter paper | | Proportion of passing through ½ of wind tunnel | |
|---|---|---|---|---|---|---|
| | Female proportion | Male proportion | Female proportion | Male proportion | Female proportion | Male proportion |
| Attractant 1 | 46.7% | 36.7% | 23.3% | 33.3% | 83.3% | 90% |
| Attractant 2 | 41.67% | 38.3% | 25% | 28.3% | 91.7% | 88.3% |
| Attractant 3 | 53.3% | 43.3% | 30% | 23.3% | 93.3% | 83.3% |

Proportion of take off = number of take off insects/total number of insects; proportion of knocking filter paper = number of insects knocking filter paper/total number of insects; proportion of passing through½ of wind tunnel = number of insects passing through ½ of wind tunnel/total number of insects.

The three attractants in Example 2 were formed with one kind of ladybug sex pheromone, one kind of aphid alarm pheromone, an aphid body surface extract, one kind of aphid honeydew volatile and one kind of aphid-induced plant volatile. As shown in the wind tunnel experiments, these formulas had good effects in stimulating ladybug take-off, long-distance search, and in ladybug short-distance location.

Example 3

0.01 mg of α-bulnesene, 0.005 mg of E-β-farnesene, 0.07 mg of benzaldehyde, 0.03 mg of isopentaldehyde and 0.12 mg of squalene were dissolved in 20 μL of n-hexane, and mixed uniformly. The above solution was then dropped evenly onto a piece of quantitative filter paper (5 cm long and 1.5 cm wide).

Wind tunnel experiments were performed using a wind tunnel device to determine the behavioral responses of ladybugs to the attractants. The wind tunnel device is 90 cm long, 35 cm wide and 35 cm high. The desired ladybugs were put into a glass tube 30 minutes before the test, and both the ends of the glass tube were sealed with absorbent cotton to adapt the ladybugs to the environment in the wind tunnel. The filter paper-loaded compound was placed on the upper air outlet, and the wind speed in the wind tunnel was 0.3 m/s. The whole process of bioassay was carried out at 28° C. The glass tube with the ladybugs was placed at the end of the lower air outlet of the wind tunnel. Timing started and lasted for 30 min. The proportions of take-offs, directional flights, and proximity to attractant sources were recorded.

Comparative Example 6

The mass of the ladybug sex pheromone was decreased. α-bulnesene, α-bulnesene:E-β-farnesene:benzaldehyde:isopentaldehyde:squalene=0.5:0.5:7:3:12.

0.005 mg of α-bulnesene, 0.005 mg of E-β-farnesene, 0.07 mg of benzaldehyde, 0.03 mg of isopentaldehyde and 0.12 mg of squalene were dissolved in 20 μL of n-hexane, and mixed uniformly. The above solution was dropped evenly onto a piece of quantitative filter paper (5 cm long and 1.5 cm wide).

Comparative Example 7

The mass of E-β-farnesene, which was an aphid alarm pheromone, was decreased. α-bulnesene:E-β-farnesene:benzaldehyde:isopentaldehyde:squalene=1:0.1:7:3:12.

0.01 mg of α-bulnesene, 0.001 mg of E-β-farnesene, 0.07 mg of benzaldehyde, 0.03 mg of isopentaldehyde and 0.12 mg of squalene were dissolved in 20 μL of n-hexane, and mixed uniformly. The above solution was dropped evenly onto a piece of quantitative filter paper (5 cm long and 1.5 cm wide).

Comparative Example 8

The mass of benzaldehyde, which was an aphid body surface extract, was decreased. α-bulnesene:E-β-farnesene:benzaldehyde:isovaleraldehyde:squalene=1:0.5:1:3:12.

0.01 mg of α-bulnesene, 0.005 mg of E-β-farnesene, 0.01 mg of benzaldehyde, 0.03 mg of isopentaldehyde and 0.12 mg of squalene were dissolved in 20 μL of n-hexane, and mixed uniformly. The above solution and dropped evenly onto a piece of quantitative filter paper (5 cm long and 1.5 cm wide).

Comparative Example 9

The mass of isopentaldehyde, which was an aphid honeydew volatile, was decreased. α-bulnesene:E-β-farnesene:benzaldehyde:isopentaldehyde:squalene=1:0.5:7:0.5:12.

0.01 mg of α-bulnesene, 0.005 mg of E-β-farnesene, 0.07 mg of benzaldehyde, 0.005 mg of isopentaldehyde and 0.12 mg of squalene were dissolved in 20 μL of n-hexane, and mixed uniformly. The above solution and dropped evenly onto a piece of quantitative filter paper (5 cm long and 1.5 cm wide).

Comparative Example 10

The amount of squalene, which was an aphid-induced plant volatile. α-bulnesene: E-β-farnesene:benzaldehyde:isovaleraldehyde:squalene=1:0.5:7:3:2.

0.01 mg of α-bulnesene, 0.005 mg of E-β-farnesene, 0.07 mg of benzaldehyde, 0.03 mg of isopentaldehyde and 0.02 mg of squalene were dissolved in 20 μL of n-hexane, and mixed uniformly. The above solution and dropped evenly onto a piece of quantitative filter paper (5 cm long and 1.5 cm wide).

Wind tunnel experiments were performed using a wind tunnel device to determine the behavioral responses of ladybugs to the attractants of Example 3 and Comparative Examples 6-10.

The wind tunnel experimental results were shown in Table 3.

TABLE 3

| Formula | Proportion of take off | | Proportion of knocking filter paper | | Proportion of passing through ½ of wind tunnel | |
|---|---|---|---|---|---|---|
| | Female Proportion | Male Proportion | Female Proportion | Male Proportion | Female Proportion | Male Proportion |
| Example 3 | 53.3% | 43.3% | 30% | 23.3% | 93.3% | 83.3% |
| Comparative Example 6 | 36.7% | 38.3% | 25% | 28.3% | 83.3% | 81.7% |
| Comparative Example 7 | 36.7% | 35% | 30% | 30% | 83.3% | 90% |
| Comparative Example 8 | 48.3% | 43.3% | 21.7% | 23.3% | 81.7% | 78.3% |
| Comparative Example 9 | 40% | 38.3% | 18.3% | 18.3% | 80% | 83.3% |
| Comparative Example 10 | 33.3% | 28.3% | 25% | 23.3% | 71.7% | 75% |

Proportion of take off = number of take off insects/total number of insects; proportion of knocking filter paper = number of insects knocking filter paper/total number of insects; proportion of passing through ½ of wind tunnel = number of insects passing through ½ of wind tunnel/total number of insects.

The attraction to ladybugs was decreased as the amount of the ladybug sex pheromone was reduced, indicating that the sex pheromone played vital function in attracting the ladybugs. The reduce of the kairomone compound impacted greatly on the ladybug's behavior of searching for the compound at short distance. After reducing the quantity of the synomone, the numbers of ladybugs taking off and passing through ½ of the wind tunnel changed a lot, showing that the synomone was important in ladybugs' long distance location.

Example 4

1-vinyl-1-methyl-2,4-di (propyl-1-ene-2-yl) cyclohexane 0.01 mg, E-β-farnesene 0.005 mg, trans-2-hexenoic acid 0.07 mg, isopentaldehyde 0.03 mg and squalene 0.12 mg were dissolved in 20 μL of n-hexane, and mixed uniformly. The above solution was uniformly dropped onto a piece of quantitative filter paper (5 cm long and 1.5 cm wide).

Wind tunnel experiments were performed using a wind tunnel device to determine the behavioral responses of ladybugs to the attractants. The wind tunnel device is 90 cm long, 35 cm wide and 35 cm high. The desired ladybugs were put into a glass tube 30 minutes before the test, and both the ends of the glass tube were sealed with absorbent cotton to adapt the ladybugs to the environment in the wind tunnel. The filter paper-loaded compound was placed on the upper air outlet, and the wind speed in the wind tunnel was 0.3 m/s. The whole process of bioassay was carried out at 28° C. The glass tube with the ladybugs was placed at the end of the lower air outlet of the wind tunnel. Timing started and lasted for 30 min. The proportions of take-offs, directional flights, and proximity to attractant sources were recorded.

Comparative Example 11

This comparative example provided a ladybug attractant, which was different from Example 4 only in that the ladybug sex pheromone component, 1-vinyl-1-methyl-2,4-bis (propyl-1-ene-2-yl) cyclohexane, was deleted.

Comparative Example 12

This comparative example provided a ladybug attractant, which was different from Example 4 only in that the aphid alarm pheromone component, E-β-farnesene, was deleted.

Comparative Example 13

This comparative example provided a ladybug attractant, which was different from Example 4 only in that the aphid body surface extract, trans-2-hexenoic acid, was deleted.

Comparative Example 14

This comparative example provided a ladybug attractant, which was different from Example 4 only in that the aphid honeydew volatile, isovaleraldehyde, was deleted.

Comparative Example 15

This comparative example provided a ladybug attractant, which was different from Example 4 only in that the aphid-induced plant volatile, squalene, was deleted.

Comparative Example 16

This comparative example provided a ladybug attractant, which was different from Example 4 in that the attractant only contained a ladybug sex pheromone component (1-vinyl-1-methyl-2,4-di (propyl-1-ene-2-yl) cyclohexane 0.01 mg). The ladybug sex pheromone component was dissolved in 20 μL of n-hexane and mixed uniformly. The above solution was dropped evenly onto a piece of quantitative filter paper (5 cm long and 1.5 cm wide).

Comparative Example 17

This comparative example provided a ladybug attractant, which was different from Example 4 in that the attractant only contained an aphid alarm pheromone component (E-β-farnesene 0.005 mg). The aphid alarm pheromone component was dissolved in 20 μL of n-hexane, mixed uniformly. The above solution was dropped evenly onto a piece of quantitative filter paper (5 cm long and 1.5 cm wide).

Comparative Example 18

This comparative example provided a ladybug attractant, which was different from Example 4 in that the attractant only contained an aphid body surface extract (trans-2-hexenoic acid 0.07 mg). This aphid body surface extract was dissolved in 20 μL of n-hexane, and mixed uniformly. The above solution was dropped evenly onto a piece of quantitative filter paper (5 cm long and 1.5 cm wide).

Comparative Example 19

This comparative example provided a ladybug attractant, which was different from Example 4 in that the attractant only contained an aphid honeydrew volatile (0.03 mg of isovaleraldehyde). The aphid honeydrew volatile was dissolved in 20 μL of n-hexane and mixed uniformly. The above solution was dropped evenly onto a piece of quantitative filter paper (5 cm long and 1.5 cm wide).

Comparative Example 20

This comparative example provided a ladybug attractant, which was different from Example 4 in that the attractant only contained an aphid-induced plant volatile (squalene 0.12 mg). The aphid-induced plant volatile was dissolved in 20 μL of n-hexane and mixed uniformly. The above solution was dropped evenly onto a piece of quantitative filter paper (5 cm long and 1.5 cm wide).

Wind tunnel experiments were performed using a wind tunnel device to determine the behavioral responses of ladybugs to the attractants of Example 4 and Comparative Examples11-20. The wind tunnel experimental results were shown in Table 4.

indicating that the kairomone had great influence on ladybug' searching at short distance. Comparative Example 15 deleted the synomone, and impacted significantly on the take offs and passing through ½ of the wind tunnel of the ladybugs, thus illustrating that the synomones was important in long distance location of the ladybugs. Comparative Example 16 formed only of the ladybug sex pheromone, which had a better effect on attracting male ladybugs but worse than Example 4. Comparative Examples 17, 18 and 19 made only of kairomones, had poor attraction to female and male ladybugs, and especially their stimulative effects on take-off and passing through ½ of the wind tunnel of the ladybugs were obvious worse than the other two groups. This results showed that the kairomone had poor effect on guiding ladybugs' search for compound at long distance. Comparative Example 20 only added the aphid-induced plant volatile namely the synomone, the number of insects knocking filter paper was significant less that the other examples while stimulating of ladybugs taking off and of ladybugs passing through ½ of the wind tunnel did not vary much. As a result, this indicated that the synomone had poor effect on guiding ladybugs' search for compound at short distance. Furthermore, compared with Example 4, the effect of Comparative Example 20 decreased little, thus indicating the type of the compound is more important compared with the amount of the compound.

TABLE 4

| Formula | Proportion of take off | | Proportion of knocking filter paper | | Proportion of passing through ½ of wind tunnel | |
|---|---|---|---|---|---|---|
| | Female proportion | Male proportion | Female proportion | Male proportion | Female proportion | Male proportion |
| Example 4 | 48.3% | 55.0% | 31.7% | 35.0% | 93.3% | 86.7% |
| Comparative Example 11 | 21.7% | 20% | 13.3% | 6.7% | 80% | 53.3% |
| Comparative Example 12 | 28.3% | 35% | 18.3% | 20% | 66.7% | 53.3% |
| Comparative Example 13 | 36.7% | 40% | 6.7% | 13.3% | 66.7% | 58.3% |
| Comparative Example 14 | 26.7% | 38.3% | 26.7% | 20% | 73.3% | 60% |
| Comparative Example 15 | 20% | 18.3% | 20% | 20% | 40% | 48.3% |
| Comparative Example 16 | 0 | 21.7% | 0 | 11.7% | 13.3% | 73.3% |
| Comparative Example 17 | 20% | 20% | 11.7% | 8.3% | 51.7% | 38.3% |
| Comparative Example 18 | 11.7% | 20% | 10% | 8.3% | 53.3% | 46.7% |
| Comparative Example 19 | 13.3% | 10% | 11.7% | 15% | 58.3% | 56.7% |
| Comparative Example 20 | 20% | 26.8% | 13.3% | 6.7% | 61.7% | 66.7% |

Proportion of take off = number of take off insects/total number of insects; proportion of knocking filter paper = number of insects knocking filter paper/total number of insects; proportion of passing through ½ of wind tunnel = number of insects passing through ½ of wind tunnel/total number of insects.

The effect of Comparative Example 11 on ladybug attraction decreased due to the deletion of the ladybug sex pheromone, showing that the ladybug sex pheromone played an important role in attracting ladybug. In Comparative Examples 12, 13 and 14, the numbers of insects knocking filter paper were decreased as the kairomone was removed, Note: *Coccinella septempunctata* were used in the above wind tunnel experiments; when the *Rodolia limbata, Harmonia axyridis, Propylaea japonica* and *Chilocorus rubidus* hope were taken as the experiment objects, the results (trend) were basically the same as that of *Coccinella septempunctata*.

Example 5

Field experiments of the attractants:

Attractant 4: α-bulnesene:E-β-farnesene:trans-2-hexenoic acid:isovaleraldehyde: nonaldehyde=1:0.5:7:3:12;

Attractant 5: α-humulene:E-β-farnesene:2,5-hexanedione: dipentene:phenylacetaldehyde=1:0.5:7:3:12;

Attractant 6: α-bulnesene:E-β-farnesene:benzaldehyde:isovaleraldehyde:squalene=1:0.5:7:3:12.

Attractants 4, 5 and 6 were formed by the following process. 0.01 mg of a ladybug sex pheromone, 0.005 mg of an aphid alarm pheromone, 0.07 mg of an aphid body surface extract, 0.03 mg of an aphid honeydew volatile, 0.12 mg of an aphid-induced plant volatile were dissolved in 20 µL of n-hexane, and mixed uniformly. The above solution was evenly dropped onto a piece of quantitative filter paper (5 cm long and 1.5 cm wide).

Comparative Example 21

An experiment of ladybug attraction was conducted in a pumpkin field, Xiaoshan District, Hangzhou City, Zhejiang Province from Sep. 22, 2018 to Sep. 28, 2018. A pumpkin field where pumpkin and weeds had similar grow condition was selected as the experimental area. 0.01 mg of 1R-α-pinene, 0.005 mg of 1-chlorooctadecane and 0.16 mg of 1,8-cineole were dissolved in 20 µL of n-hexane solution to obtain Attractant 7. 20 µL of Attractant 7 was added to a rubber carrier to prepare an attractor core. After the solvent volatilization, clean n-hexane was added to fully infiltrate the drug into the rubber. The prepared attractor core was placed on a stick plate, which was then hung in the pumpkin field. The height of the stick plate was flushed with the height of the pumpkin plant, and the distance between adjacent traps was 5 m. Each treatment was set with 5 repetitions and randomly arranged. The rubber carrier added with 20 µL of n-hexane was used as CK control group. On the second day after setting, the species and proportion of adult ladybugs were investigated. The results were shown in Table 5.

TABLE 5

| Formula | Coccinella septempunctata | Rodolia limbata | Harmonia axyridis | Propylaea japonica | Chilocorus rubidus |
|---|---|---|---|---|---|
| Attractant 4 | 27% | 9% | 29% | 21% | 14% |
| Attractant 5 | 20% | 3% | 45% | 23% | 9% |
| Attractant 6 | 21% | 4% | 52% | 12% | 11% |
| Attractant 7 | 10% | 82% | 8% | 0% | 0% |
| CK | 0 | 0 | 0 | 0 | 0 |

In Table 5, the proportions of the number of each kind of ladybugs attracted by the attractant to the total number of ladybugs attracted by the attractant were shown. The total number of ladybugs attracted by Attractants 4, 5, 6 and 7 were the same, but the CK control group did not any attract ladybugs.

Among the four groups of attractant formulations, Attractants 4, 5 and 6 were the attractants selected in the disclosure, and Attractant 7 was the attractant in patent CN201810000523.4. According to the data in Table 5, Attractants 4, 5 and 6 had good attractiveness to important ladybugs in the field such as *Coccinella septempunctata* and *Harmonia axyridis*. Attractant 7 only had good attractiveness to *Rodolia limbata*, but it has poor attractiveness to other ladybugs with large quantity and large food consumption in field. The results showed that the attractant of the present disclosure had good attractiveness to ladybugs, and its attractiveness was broad-spectrum.

Finally, it should be noted that the above listed are only a number of specific embodiments of the disclosure. Obviously, the disclosure is not limited to the above embodiments, and there can be many deformations. All deformations that can be directly derived from or associated with the contents of the disclosure by those skilled in the art shall be considered as the protection scope of the disclosure.

What is claimed is:

1. A ladybug attractant, wherein the attractant consists of α-bulnesene, E-β-farnesene, benzaldehyde, isovaleraldehyde, and squalene at a mass ratio of 1:0.5:7:3:12, respectively.

\* \* \* \* \*